United States Patent
Mishima et al.

(10) Patent No.: US 10,003,782 B2
(45) Date of Patent: Jun. 19, 2018

(54) IMAGE PROCESSING DEVICE, METHOD, COMPUTER-READABLE MEDIUM AND 3D IMAGE DISPLAY

(71) Applicant: KABUSHIKI KAISHA TOSHIBA, Tokyo (JP)

(72) Inventors: Nao Mishima, Tokyo (JP); Takeshi Mita, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 301 days.

(21) Appl. No.: 14/066,068

(22) Filed: Oct. 29, 2013

(65) Prior Publication Data
US 2014/0125656 A1 May 8, 2014

(30) Foreign Application Priority Data
Nov. 1, 2012 (JP) .................. 2012-242038

(51) Int. Cl.
*H04N 13/00* (2018.01)
*G06T 7/33* (2017.01)

(52) U.S. Cl.
CPC ........ *H04N 13/0011* (2013.01); *G06T 7/337* (2017.01); *G06T 2207/20016* (2013.01); *H04N 2013/0081* (2013.01)

(58) Field of Classification Search
CPC ............ H04N 13/001; H04N 13/0011; H04N 2013/0081; G06T 7/003; G06T 2207/20016

(Continued)

(56) References Cited

U.S. PATENT DOCUMENTS

| 5,072,293 A | 12/1991 | De Haan et al. |
| 2004/0252764 A1* | 12/2004 | Hur .................. H04N 5/145 375/240.16 |

(Continued)

FOREIGN PATENT DOCUMENTS

| JP | 3147893 | 1/2001 |
| JP | 2005-12798 | 1/2005 |

(Continued)

OTHER PUBLICATIONS

JP Notification of Reasons for Refusal dated May 10, 2016 for corresponding Japanese patent application No. 2012-242038, with Machine Translation.

*Primary Examiner* — William C Vaughn, Jr.
*Assistant Examiner* — Jae N Noh
(74) *Attorney, Agent, or Firm* — Finnegan, Henderson, Farabow, Garrett & Dunner, L.L.P.

(57) ABSTRACT

A device according to embodiments may comprise an acquisition unit, an arrangement unit, a calculating unit, and a processing unit. The acquisition unit may acquire candidate vectors from among corresponding vectors which have been calculated for each candidate block around the target block. The arrangement unit may arrange particles around each candidate block indicated by each of the acquired candidate vectors while using the target block as an origination, and arrange particle vectors while using the target block as an origination. The calculating unit may calculate a correlation between a pixel value of the target block and a pixel value of each block defined by each of the particles, and give a weight depending on the calculated correlation to each of the particle vectors. The processing unit may obtain the corresponding vector for the target block based on the weight calculated for each of the particle vectors.

14 Claims, 15 Drawing Sheets

(58) Field of Classification Search
USPC .................................................. 375/240.01
See application file for complete search history.

(56) References Cited

U.S. PATENT DOCUMENTS

| | | |
|---|---|---|
| 2008/0180535 A1 | 7/2008 | Habuka et al. |
| 2008/0226193 A1 | 9/2008 | Mishima et al. |
| 2009/0290643 A1* | 11/2009 | Yang ................ H04N 19/00769 375/240.16 |
| 2012/0027095 A1* | 2/2012 | Sakamoto .............. H04N 19/61 375/240.16 |
| 2012/0213285 A1 | 8/2012 | Yamamoto et al. |
| 2013/0229485 A1* | 9/2013 | Rusanovskyy .... H04N 13/0048 348/43 |
| 2014/0205014 A1* | 7/2014 | Nakamura ........... H04N 19/105 375/240.16 |
| 2014/0376614 A1* | 12/2014 | Fukushima ............ H04N 19/56 375/240.02 |

FOREIGN PATENT DOCUMENTS

| | | |
|---|---|---|
| JP | 2007-018098 | 1/2007 |
| JP | 2007-228400 A | 6/2007 |
| JP | 2007-334583 | 12/2007 |
| JP | 2008-226187 | 9/2008 |
| WO | WO 2006/075394 A1 | 7/2006 |
| WO | WO-2011/074121 A1 | 6/2011 |

* cited by examiner

IMAGE PROCESSING DEVICE, METHOD, COMPUTER-READABLE MEDIUM AND 3D IMAGE DISPLAY

CROSS-REFERENCE TO RELATED APPLICATION(S)

This application is based upon and claims the benefit of priority from the Japanese Patent Application No. 2012-242038, filed on Nov. 1, 2012; the entire contents of which are incorporated herein by reference.

FIELD

Embodiments described herein relate generally to an image processing device, a method, a computer-readable medium and a 3D image display.

BACKGROUND

Conventionally, there is a corresponding point detecting device for corresponding between two images by seeking a high-correlation region from one image to another image. For instance, there is a technique of using vectors of blocks having been calculated at a space or a passed frame as candidate vectors, limiting a search to regions with update vectors added to the candidate vectors, and conducting a recursive processing on the whole image.

DETAILED DESCRIPTION

Exemplary embodiments of an image processing device, a method, a computer-readable medium and a 3D image display will be explained below in detail with reference to the accompanying drawings. Embodiments described below are examples for solving a problem for obtaining partial regions having high correlations with partial regions in a target image from a reference image. For example, the embodiments can be applied to a problem of obtaining motion vectors from one frame to another frame in a motion picture, problems of tracking of objects in a motion picture, frame interpolation of a motion picture and association from a left-eye image to a right-eye image in a stereo image for a stereoscopic vision with a naked eye, or the like.

First Embodiment

Firstly, an image processing device, a method; a computer-readable medium and a 3D image display according to a first embodiment will be explained below in detail with reference to the accompanying drawings. In the first embodiment, a case of solving a problem of obtaining motion vectors (also referred to as a motion estimation) from one frame (target image) to another frame (reference image) in a motion picture will be explained as an example.

Figure 1:
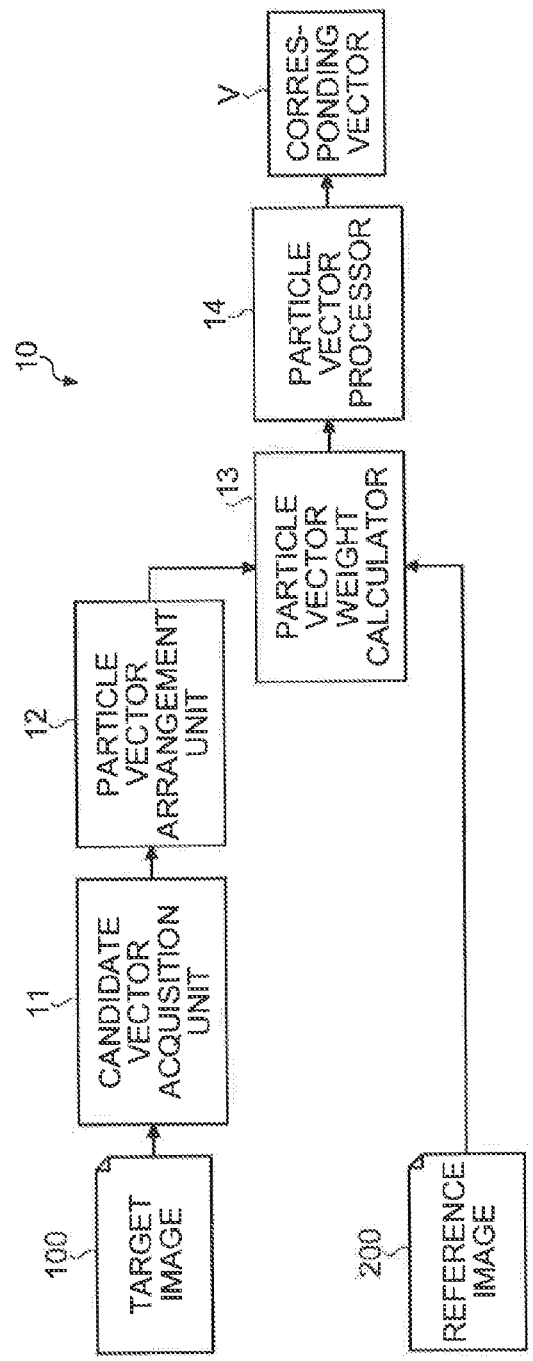
FIG. 1 is a block diagram, showing an example of an outline structure of an image processing device according to a first embodiment.

FIG. 1 is a block diagram snowing an example of an outline structure of an image processing device according to the first embodiment. An image processing device 10 shown in FIG. 1 calculates a corresponding vector V indicating an association from a partial region on a target image 100 to a partial region on a reference image 200. In the following, the partial region including one or more pixels is referred to as a block. Furthermore, a block being a process target on the target image is referred to as a target block and a block on the reference image 200 corresponded with the target block is, referred to as a corresponding block.

The target image 100 corresponds to one frame in a motion picture, and the reference image 200 corresponds to another frame in the motion picture. As shown in FIG. 1, the image processing device 10 has a candidate vector acquisition unit 11, a particle vector arrangement unit 12, a particle vector weight calculator 13, and a particle vector processor 14.

To the candidate vector acquisition unit 11, the target image 100 is inputted from the external superior device, for instance. The candidate vector acquisition unit 11, with respect to a target block on the inputted target image 100, specifies one or more blocks (hereinafter to be referred to as candidate blocks) adjacent to the target block, and acquires one or more corresponding vectors from among the corresponding vectors having been calculated for each of the candidate blocks as candidate vectors (candidate vector acquiring step).

The particle vector arrangement unit 12 arranges one or more particles around each of blocks (hereinafter to be referred to as candidate corresponding blocks) indicated by the one or more candidate vectors acquired by the candidate-vector acquisition unit 11 while using the target block as an origination, and arranges particle vectors respectively indicating each particle from the target block (particle vector arranging step). Here, originations of the corresponding vector, the candidate vectors and the particle vectors are defined at predetermined position in reference blocks (for instance, a left top pixel or a central pixel), respectively. In the following, for simplification of explanation, it will simply be described as "block as a reference".

In this explanation, the particle vector is a vector indicating a position of a particle arranged on an image according to a predetermined manner. A particle is a point indicating a position on an image indicated by a candidate vector. The image indicated by the candidate vector is the reference image 200 or a superimposed image 100A of the target image 100 and the reference image 200 (see FIG. 8). In this explanation, for simplification of explanation, the reference image 200 and the superimposed image 100A are not distinguished from each other. The particle can also be treated as a single pixel in an image in times of processing. In the first embodiment, around a candidate block indicated by a candidate vector, one ore more particles are arranged. Therefore, in the first embodiment, one ore more particle vectors are arranged for each candidate vector. However, when a plurality of candidate vectors are acquired for the target block, at least one particle vector can be arranged for at least one candidate vector among these candidate vectors.

The reason for arranging as at least one particle vector at a place being around a candidate vector bat not at a place where the candidate vector is placed is that there is a possibility that when no particle vector is arranged, due to solution being not converged, a value of the corresponding vector V consistently becomes 0.

The particle vector weight calculator 13 calculates a correlation between the target block and each block appointed by each particle, respectively, and gives weights depending on the calculated correlations to respective particle vectors (particle vector weight calculating step). Here, the correlation may be an indication based on pixel values such as brightness, values of color components of RGB, values of color space of YUV, etc., or the like. In such case, a small difference (difference of pixel, values) means a high correlation. Furthermore, as well as the originations of the corresponding vector and the candidate vectors, the particles are positioned at predetermined positions in blocks (for instance, left top pixels or central pixels). In other word, blocks indicated by the particle vectors of which correlations with the target blocks are to be calculated are blocks (partial regions) defined by the particles. A size of the blocks defined by the particles may be the same as that of the target block and the candidate blocks.

The particle vector processor 14 calculates the corresponding vector V for the target block by statistically processing the one or more particle vectors based on the weights calculated for the particle vectors (particle vector processing step).

Figure 2:
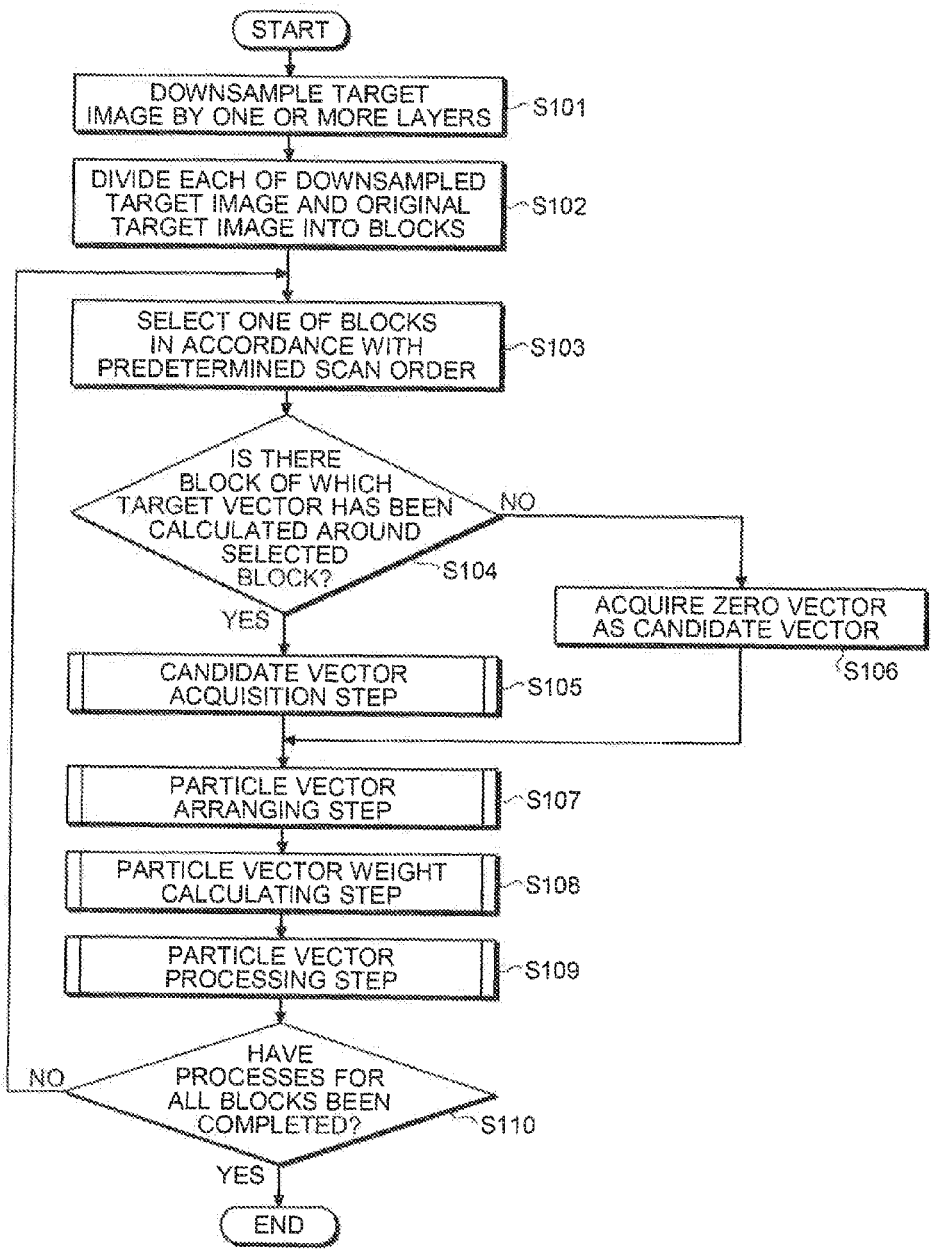
FIG. 2 is a flowchart showing an operation example of the image processing device shown in FIG. 1.

Next, an operation example of the image processing device 10 shown in FIG. 1 will be described in detail, using a flowchart shown in FIG. 2. As shown in FIG. 2, the candidate vector acquisition unit 11 conducts downsampling of the target image 100 inputted, from a superior device by one or more layers (step S101). Thereby, based on the target image 100, target images having a hierarchic structure are generated.

Next, the candidate vector acquisition unit 11 divides each of the original target image 100 and the target image generated by the downsampling into a plurality of target blocks (step S102). Then, the candidate vector acquisition unit 11 selects one target block from among the plurality of the target blocks in accordance with a predetermined scan order (seep S103).

Figure 3:
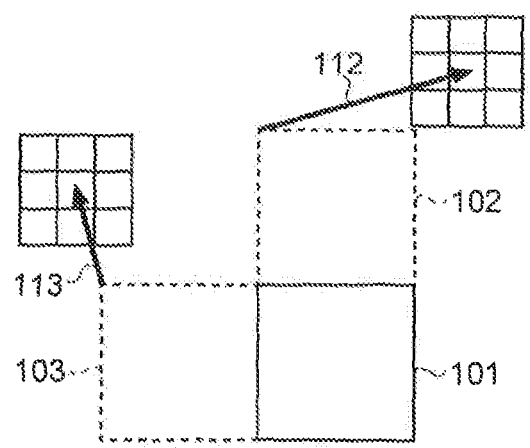
FIG. 3 is an illustration showing an example in a case where two processed blocks exist, with respect to a target block in the first embodiment.
Figure 4:
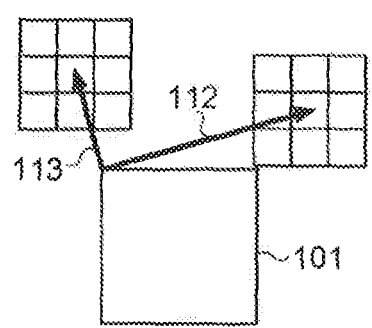
FIG. 4 is an illustration showing an example of candidate blocks in the first embodiment.

Next, the candidate vector acquisition unit 11 determines whether one or more other blocks of which corresponding vectors have been calculated (hereinafter to be referred, to as processed blocks) exist around the selected target block or not (step S104). As a result of the determination, when the processed block does not exist (step S104; NO), the candidate vector acquisition unit 11 acquires a predetermined vector (for instance, 0 (zero) vector) as a candidate vector for the selected target block (step S106). On the other hand, when one or more processed blocks exist (step S104; YES), the candidate vector acquisition unit 11 executes the candidate vector acquisition step in which at least one candidate block is selected from among the processed blocks and one or more corresponding vectors are acquired as one or more candidate vectors from among one or more corresponding vectors of the one or more selected candidate blocks (step S105). For example, in FIG. 3, a case where two processed blocks 102 and 103 exist for the target block 101 is exemplified. In such case, in step S105, as shown in FIG. 4, at least one (in FIG. 4, two) of the two processed blocks 102 and 103 is selected as the candidate block(s), and at least one (in FIG. 4, two) of corresponding vectors 112 and 113 which have been calculated for the processed blocks 102 and 103, respectively, is acquired as the candidate vector(s).

Next, the particle vector arrangement unit 12 executes the particle vector arranging step in which one or more particle vectors are arranged with respect to the selected target block (step S107). Then, the particle vector weight calculator 13 executes the particle vector weight calculating step in which weight(s) to be given to the one or more arranged particle vectors is calculated (step S108). For example, in FIG. 5, a case where a weight 122 being a probability distribution is calculated, for the candidate vector 112 is exemplified.

Figure 5:
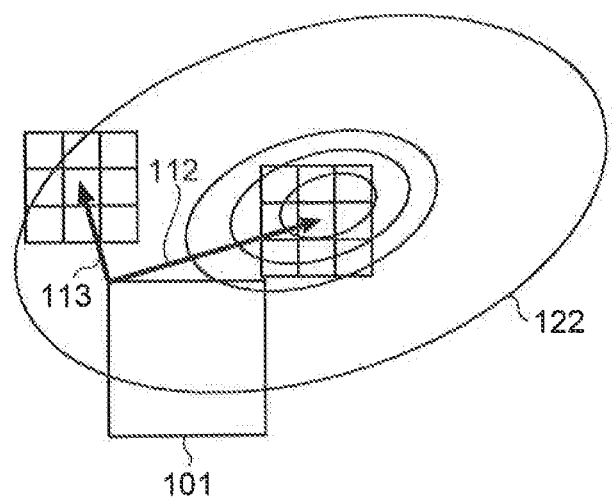
FIG. 5 is an illustration showing an example of weights of particle vectors in the first embodiment.
Figure 6:
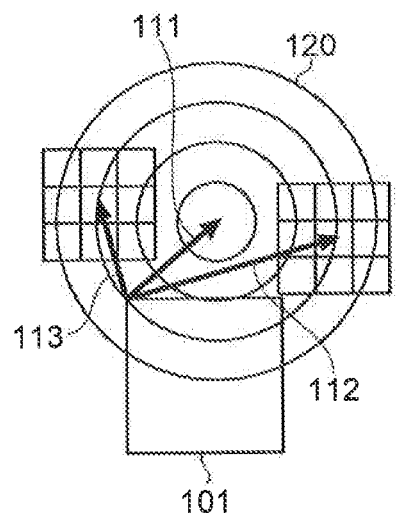
FIG. 6 is an illustration showing an example of a result of statistical processing in the first embodiment.

Next, the particle vector processor 14 executes the particle vector processing step in which a corresponding vector for the selected target block is calculated by statistically processing the one or more particle vectors based on the weight(s) calculated for the one or more particle vectors (step S109). That is, as shown in FIG. 5, by statistically processing the one or more particle vectors based on the weight(s) calculated for the one or more candidate vectors 112 and 113, respectively, it is possible to obtain a probability distribution 120 as shown in FIG. 6. As shown in FIG. 6, the corresponding vector 111 for the target block 101 can be obtained based on the probability distribution 120 (for instance, a gravity point or a central point thereof).

After that, the image processing device 10 determines whether the processes of obtaining the corresponding vectors for ail the target blocks are completed or not (step S110), and when the processes are completed (step S110; YES), finishes this operation. On the other hand, when the processes are not completed (step; S110; NO), the image processing device 10 returns to step S103, selects the next target block according to the predetermined scan order, and executes the following operation.

Here, when a coordinate $(X, h)^T$ of each pixel is defined as $(X, h)^T = (x, y, h)^T$ while a certain pixel (for instance, a left bottom pixel) in an image having a hierarchic structure is defined as an origin, a pixel value of each pixel on one image (for instance, the target image 100) can be described as $A_o(X, h)$, and a pixel value of each pixel on the other image (for instance, the reference image 200) can be described as $A_r(X, h)$. Here, T represents a transposition of a matrix vector. A column vector is represented in capitals. These pixel values $A_o(X, h)$ and $A_r(X, h)$ can be represented as $A_o(x, y, h)$ and $A_r(x, y, h)$, respectively.

Furthermore, h represents a hierarchy. A hierarchy means a pyramid hierarchy of image. As a most basic pyramid hierarchy, there is a Gaussian pyramid represented by the following formula (1), for instance.

$$A(x,y,h+1) = G(\uparrow A(x,y,h)) \quad (1)$$

In the formula (1), an up arrow represents downsampling, and G( ) represents a Gaussian filter. That is, the Gaussian pyramid means a pyramid hierarchy constructed from one or more image obtained by downsizing an image by downsampling while smoothing the image using the Gaussian filter and the original image. Therefore, h=0 means the original image, and h=1 means an image obtained by conducting downsampling on the original image once.

In the following explanation, a scale of downsampling, i.e., times reduced from the original image by downsampling, is represented as ρ. For example, when the original image is reduced by half in horizontal and vertical directions, ρ becomes 2.

In addition, the first embodiment is not limited to such case of using the pyramid hierarchy. That is, it is also possible to apply the first embodiment to a case of using only h=0.

Figure 7:
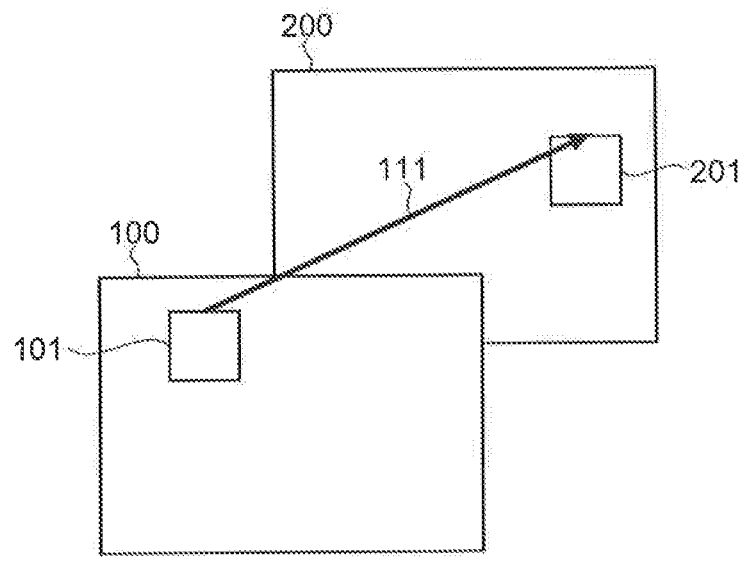
FIG. 7 is an illustration for defining a problem for calculating a corresponding block on a reference image having a high correlation with the target block on a target image.
Figure 8:
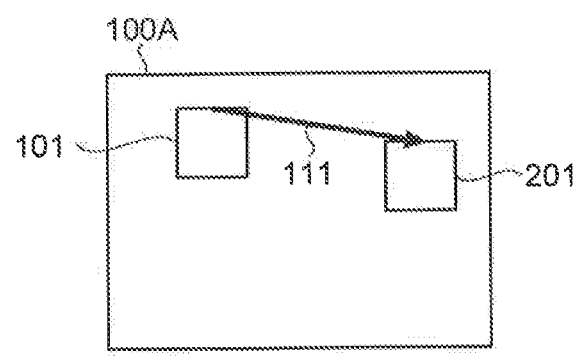
FIG. 8 is a 2D projection of the definition shown in FIG. 7.

Coordination between the target block 101 on the target image 100 and the corresponding block 201 on the reference image 200, the corresponding block 201 having high correlation with the target block 101, is defined using the corresponding vector. Here, a problem of calculating the corresponding block 201 on the reference image 200, the corresponding block 201 having high correlation with the target block 101 on the target image 100, can be defined as shown in FIG. 7. In FIG. 7, the vector 111 is a vector indicating from a reference pixel in the target block 101 on the target image 100 to a corresponding pixel in the corresponding block 201 on the reference image 200, the corresponding block 201 having high correlation with the target block 101. When a relationship shown in FIG. 7 is projected, to a 2D plane, the relationship can be illustrated as shown in FIG. 8. In this explanation, the vector 111 indicating from a reference, pixel in the target block 101 on a superimposed image 100A of the target image 100 and the reference image 200 to a corresponding pixel in the corresponding block 201 is defined as a corresponding vector. This is the same as a definition used for calculating motion vectors or corresponding points in stereo correspondance with respect to multiview images.

When an image has a pyramid hierarchy, it can be assumed that the corresponding vector V (see FIG. 1) also has a pyramid hierarchy of which number of hierarchies is the same as the image. In such case, a corresponding vector V(X, h) with a coordinate X and a hierarchy h can be represented by the following formula (2).

$$V(X,h) = (v_x(X,h), v_y(X,k))^T \quad (2)$$

Furthermore, when a time t given to the image is also taken into consideration, that is, when processes are executed while also considering a timeline, a corresponding vector V(X, h, t) can be represented by the following formula (3).

$$V(x,k,t) = (v_s(X,h,t), v_y(X,h,t))^T \quad (3)$$

When a motion picture is processed, the target image 100 and the reference image 200 change depending on the time t. On the other hand, when a stationary picture is processed, the target image 100 and the reference image 200 do not change even if the time t changes.

Figure 9:
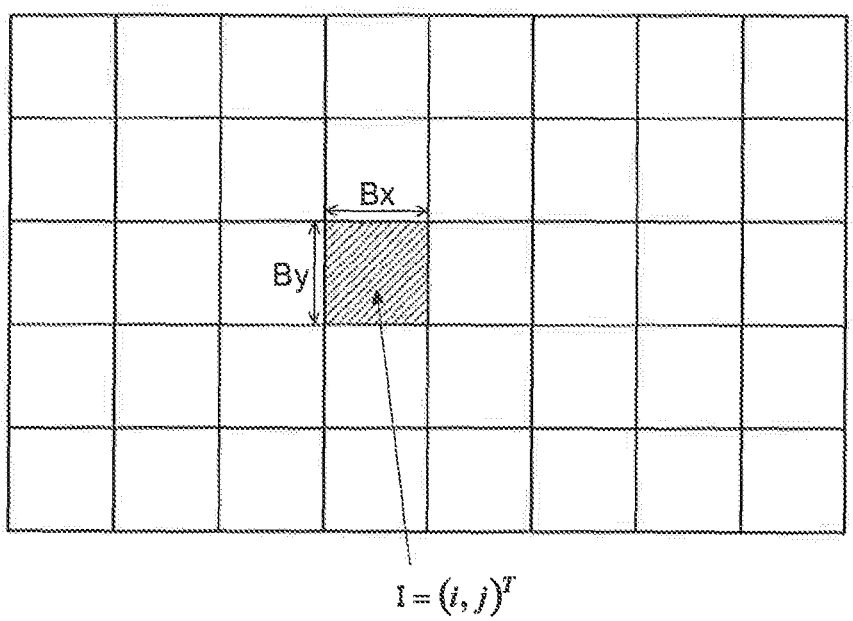
FIG. 9 is an illustration showing an example of a processing target treated in a single process in the first embodiment.

As shown in FIG. 9, a process the target treaded at a single process is a block unit grouping one ore more pixels. These blocks can be obtained by dividing one image into predetermined divisions where the numbers of divisions in a vertical direction and a horizontal direction, respectively. The blocks can also be obtained by filling (arranging) partitions from a predetermined position (for instance, a left top pixel), each partition having a predetermined size of which pixel numbers in horizontal and vertical directions are preset.

When assuming that blocks are arranged from a left top of the image, horizontal and vertical sizes of each block is $(B_x, B_y)$ and a process target block is $I = (i, j)^T$, a left top coordinate $X_L$ in an I block can be represented by the following formula (4).

$$X_L(B_x i, B_y j)^T \quad (4)$$

Furthermore, a central coordinate $X_C$ of the I block can be represented by the following formula (5).

$$X_C = \left(B_x i + \frac{B_x}{2}, B_y j + \frac{B_y}{2}\right)^T \quad (5)$$

An operator c(I) for calculating a central coordinate of a block can be defined as the following formula (6). Here, the operator c(I) can also be described as c(i, j).

$$c(I) = \left(B_x i + \frac{B_x}{2}, B_y j + \frac{B_y}{2}\right)^T \quad (6)$$

Details of Each Step

Based on the above-described definitions, details of each step shown in FIG. 2 will, be described below with reference to the accompanying drawings.

Step S103; Scan Order of Process

Figure 10:
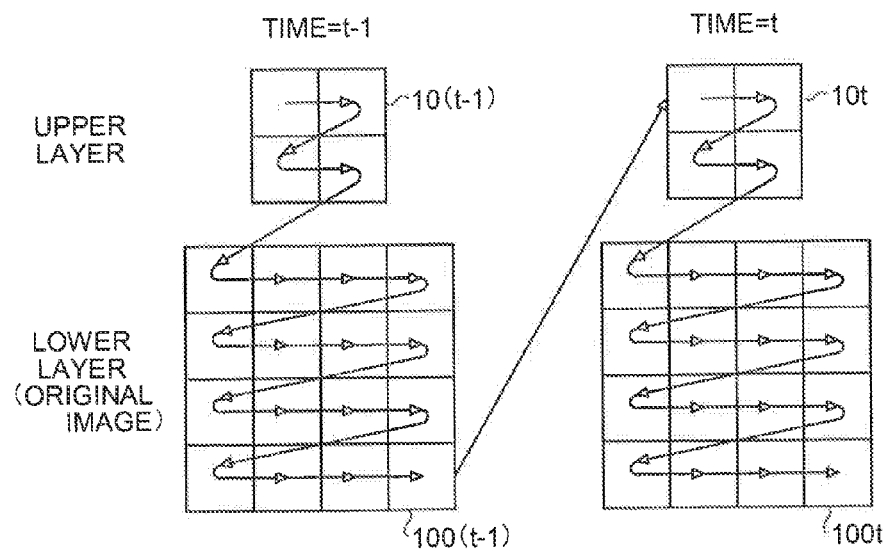
FIG. 10 is an illustration showing an example of a scan order used in a process of step S103 shown in FIG. 2.
Figure 11:
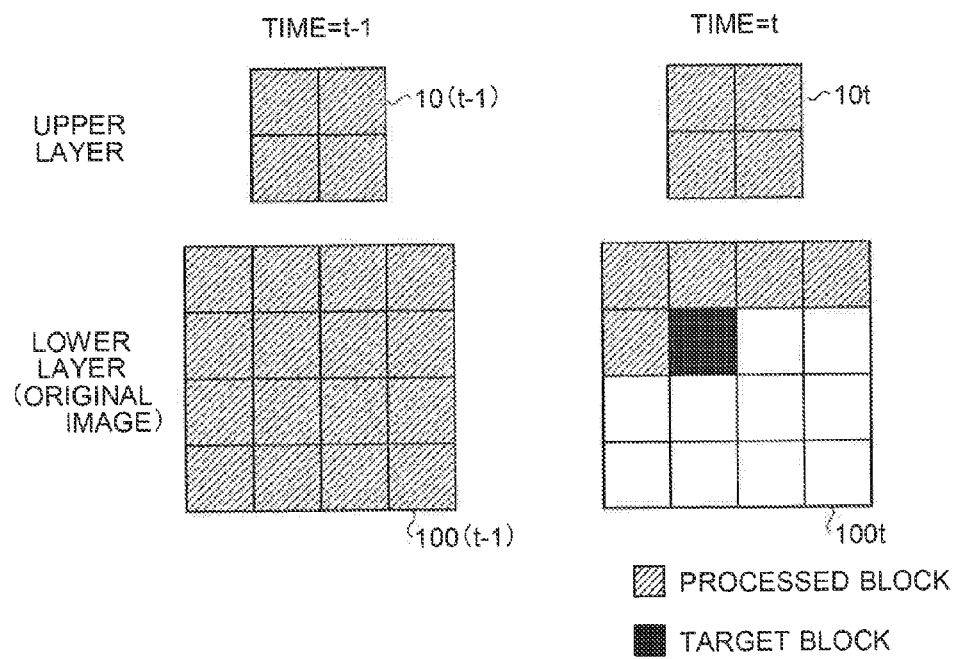
FIG. 11 is an illustration showing processed blocks processed according to the scan order shown in FIG. 10.

FIG. 10 is an illustration showing an example of a scan order used in a process of step S103 shown in FIG. 2. FIG. 11 shows processed blocks in a case where the scan order shown in FIG. 10 is used in the process of step S103. In the example shown in FIGS. 10 and 11, a reference number of an original target image at a time t−1 is set as 100(t−1), and a reference number of the original target image at a time t is set as 100t. Furthermore, an image generated by downsampling the target image 100(t−1) using ρ=2 once is defined as a target image 10(t−1), and an image generated by downsampling the target image 100t using ρ=2 once is defined as a target image 10t.

As shown in the example shown in FIG. 10, in the scan order, for instance, blocks are selected as needed in an order from past to the future in terms of a time scale, and from upward to downward in terms of a hierarchy. Furthermore, on the same plane (image), a process can be considered to be progressing from the left top to the right bottom, for instance. However, such case is not definite while various arrangements such as from the further to the past in terms of a time scale, from downward to upward in terms of a hierarchy, from the right bottom to the left top on the same plane, or the like, can be possible. In the following, as shown in FIG. 10, the scan order is set that a selection order on the same plane is from left top to right bottom, and a block located at an upper and more left side is defined as a spatially-superior block.

By selecting blocks according to the scan order shown in FIG. 10, as shown in FIG. 11, blocks located at a position further in the past in terms of a time scale and at a more superior position in terms of a hierarchy and a space as compared to the target block being a process target become processed blocks for which corresponding vectors are already calculated.

Step S105; Candidate Vector Acquiring Step

Figure 12:
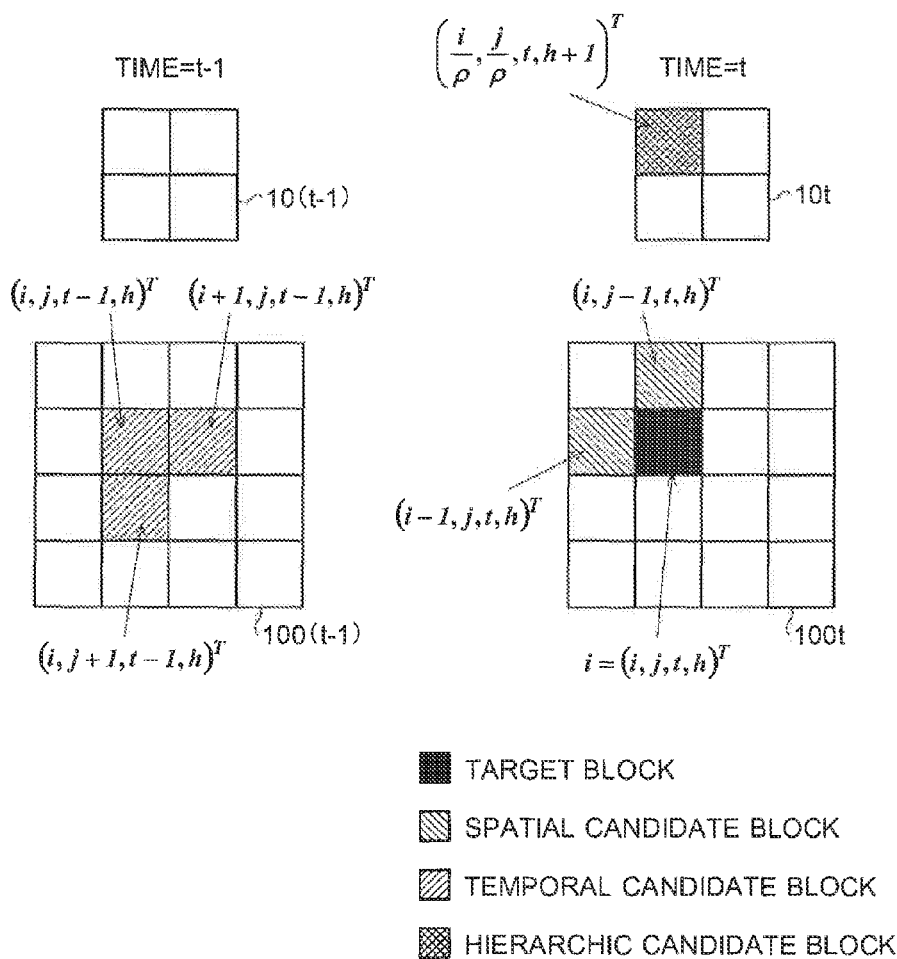
FIG. 12 is an illustration showing examples of temporal candidate blocks, hierarchic candidate blocks and spatial candidate blocks in the first embodiment.

Next, the candidate vector acquiring step shown in step S105 of in FIG. 2 will be described. In the candidate vector acquiring step, corresponding vectors of blocks located temporally, hierarchically and spatially around the target block is selected from among the processed blocks as candidate vectors. FIG. 12 shows an example in which corresponding vectors of processed blocks (temporal candidate blocks, hierarchic candidate blocks and spatial candidate blocks) located temporally, hierarchically and spatially around the target block is selected as candidate vectors. FIG. 12 merely shows one example, and it is sufficient as long as the corresponding vectors of the processed blocks around the target block are selected as the candidate vectors. The blocks located around the target block is not limited to such blocks that are temporally, hierarchically and spatially adjacent to the target block while they can include blocks canted to the target block in terms of a time scale, hierarchy and space, second or third blocks from the target block via adjacent blocks, or the like.

In the example shown in FIG. 12, a set of candidate vectors (candidate vector group) as shown in the following formula (7) can be obtained.

$$V(c(i-1, j), h, t) \quad (7)$$

$$V(c(i, j-1), h, t)$$

$$\rho V\left(c\left(\frac{i}{\rho}, \frac{j}{\rho}\right), h+1, t\right)$$

$$V(c(i, j), h, t-1)$$

$$V(c(i+1, j), h, t-1)$$

$$V(c(i, j+1), h, t-1)$$

Here, because the candidate vector group is a set, it can be defined as a candidate vector set W as shown in the following formula (8).

$$W = \left\{ \begin{array}{l} V(c(i-1, j), h, t) \\ V(c(i, j-1), h, t) \\ \rho V\left(c\left(\frac{i}{\rho}, \frac{j}{\rho}\right), h+1, t\right) \\ V(c(i, j), h, t-1) \\ V(c(i+1, j), h, t-1) \\ V(c(i, j+1), h, t-1) \end{array} \right\} \quad (8)$$

In this explanation, although all of the temporal element, the hierarchic element and the spatial element are used as candidates, it is not limited to such case. That is, it is sufficient as long as at least one element among the temporal element, the hierarchic element and the spatial element is used as a candidate.

Step S107: Particle Vector Arranging Step

Next, the particle vector arranging step shown in step S107 of FIG. 2 will be described. In the particle vector-arranging step, as described above, one or more particles are arranged around each of the one or more candidate corresponding blocks indicated by each of the one or more candidate vectors while using the target block as an origination, and a particle vector of which origin is the target block is arranged to each of the one or more particles. In other words, around each of the candidate vectors, one or more particle vectors indicating the one or more particles around the candidate corresponding block indicated, by each of the candidate blocks are arranged.

At least one particle vector should be arranged around each candidate vector without overlapping the candidate vector. However, it is not essential that at least one particle vector is arranged to each of the candidate vectors while it is sufficient as long as at least one particle vector is arranged to at least one candidate vector.

Figure 13:
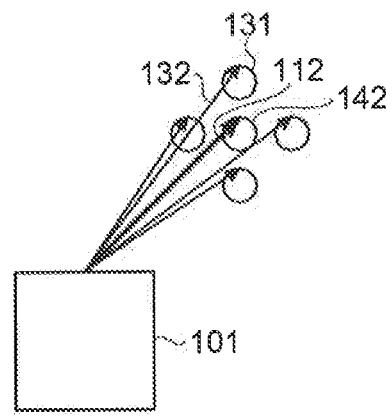
FIG. 13 is an illustration showing an example of particle vectors arranged with respect to one candidate vector in the first embodiment.

An example of particle vectors arranged to one candidate vector is shown in FIG. 13. FIG. 13 shows an example in that one or more (in FIG. 13, four) particles 131 are arranged within a circle having a predetermined diameter (for instance, 1) and a center at a point 142 indicated by a candidate vector 112, and particle vectors 132 indicating these particles are arranged with respect to the candidate vector 112. Here, the point 142 cam be the same as the particles 131.

The particles 131 within the circle having the diameter 1 (including the point 142) can be represented as a neighborhood set N shown in the following formula (9).

$$N = \{n| \|n\| \leq 1\} \quad (9)$$

In the formula (9), "$\| \|$" indicates a length. Accordingly, as shown in the following formula (10), in a case where n is an integer 1, the number of the particles 131 (including the point 142) belonging to the neighborhood set M becomes five.

$$N = \left\{ \begin{bmatrix} -1 \\ 0 \end{bmatrix}, \begin{bmatrix} 0 \\ -1 \end{bmatrix}, \begin{bmatrix} 0 \\ 0 \end{bmatrix}, \begin{bmatrix} 1 \\ 0 \end{bmatrix}, \begin{bmatrix} 0 \\ 1 \end{bmatrix} \right\} \quad (10)$$

In such case, when the candidate vector 112 is defined as w∈W, each particle vector p (132) can be represented as the following formula (11), and a particle vector set including all of the particle vectors p (132) can be represented as the following formula (12). Here, ∀ indicates all elements included in the set.

$$p = w + n \in N \quad (11)$$

$$P = \{w + n | \forall w \in W, \forall n \in N\} \quad (12)$$

Figure 14A:
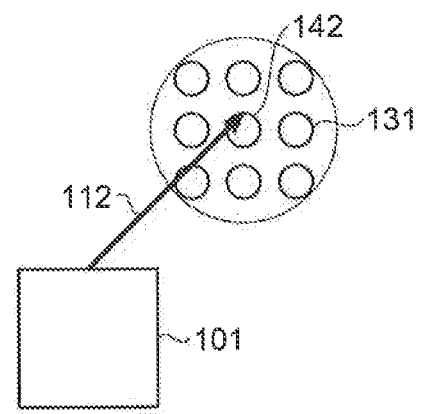
FIGS. 14A to 14C are illustrations showing another examples of arrangements of the particle vectors in the first embodiment.
Figure 14B:
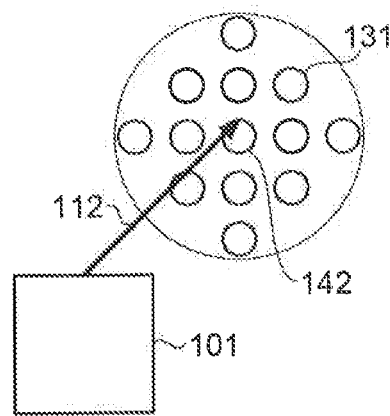
Figure 14C:
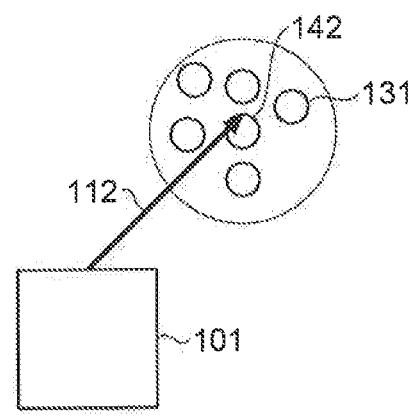

Here, the particle vectors 132 arranged to each of the candidate vectors 112 are not limited to the example shown in FIG. 13. For example, as shown in FIG. 14A, it is possible that eight particles 131 are arranged surrounding the point 142 indicated by the candidate vector 112, and particle vectors 132 indicating these particles 131 are arranged. Furthermore, as shown in FIG. 14B, it is also possible that twelve particles 131 are arranged in a circle having a diameter 2, for instance, and a center at the point 142 indicated by the candidate vector 112, and the particle vectors 132 indicating these particles 131 are arranged. Moreover, as shown in FIG. 14C, it is also possible that particle vectors 132 are arranged with respect to one or more particles 131 arranged at random within a circle having a predetermined diameter and a center at the point 142 indicated by the candidate vector 112. Here, for convenience of explanation, in FIGS. 14A to 14C, the particle vectors 132 are omitted from the drawings.

Step S108: Particle Vector Weight Calculating Step

Figure 15:
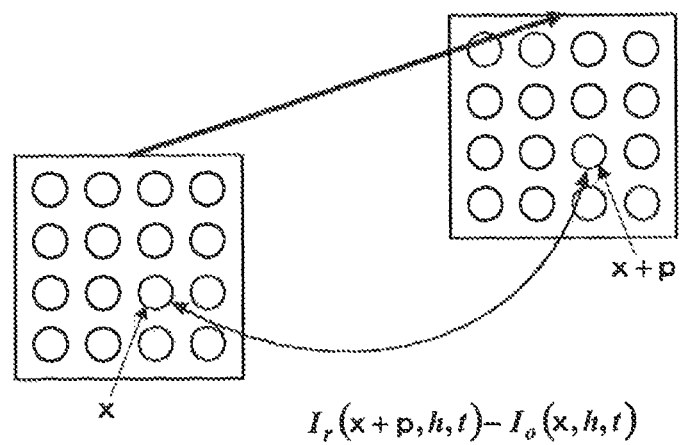
FIG. 15 is an illustration showing an example of an MSE used in the first embodiment.

Next, the particle vector weight calculating step shown in step S108 of FIG. 2 will be described. In the particle vector weight calculating step, weights are calculated for all the particle vectors. As bases for calculating weight with respect to each particle vector, a displace block difference (DBD) can be used. As one of the DBD, there is a mean squared error (MSB) such as the one shown in FIG. 15.

Here, when a particle vector is defined as p∈P, the MSB can be defined as the following formula (13).

$$MSE(I, p) = \frac{1}{B_x B_y} \sum_{X \in \{X | B_x i \leq x < B_x i + B_x, B_y j \leq y < B_y j + B_y\}} (A_r(X + p, h, t) - A_0(X, h, t))^2 \quad (13)$$

By using the formula (13), it is possible to calculate a mean of a square error between a pixel value of a target pixel in a block $I=(i, j)^T$ and a pixel value of a reference pixel in a block displaced by the particle vector.

Other than the MSB, a mean absolute difference (MAD) can be applied. Likewise, when a particle vector is defined as p∈P, the MAD can be defined as the following formula (14).

$$MAD(I, P) = \frac{1}{B_x B_y} \sum_{X \in \{X | B_x i \leq x < B_x i + B_x, B_y j \leq y < B_y j + B_y\}} |(A_r(X + p, h, t) - A_0(X, h, t)| \quad (14)$$

Next, a process for calculating a weight for each particle vector using the MSE or the MAD will be described. According to the displace block difference DBD, in both cases of using the MSE and using the MAD, a smaller value provides a smaller error. This means that a particle vector is close to a true corresponding vector. Therefore, as for weight for each particle vector, it should be arranged such that the smaller the displace block difference DBD is the larger the weight and the larger the DBD is the smaller the weight is.

Figure 16:
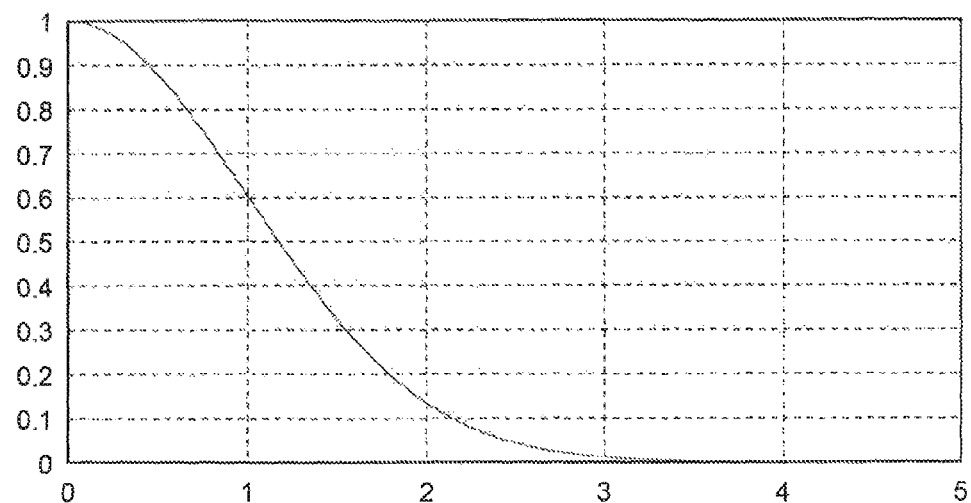
FIG. 16 is an illustration showing an example of a gauss function used in the first embodiment.

As a function (weighting function) for applying such weight, it is possible to apply a Gaussian function such as the one shown in FIG. 16, for instance. In a case of using the MSE, a weight g(I, p) using a Gaussian function can be calculated as the following formula (15).

$$g(I, p) = \exp\left(-\frac{MSE(I, p)}{2\sigma^2}\right) \quad (15)$$

On the other hand, in a case of using the MAD, a weight g(I, p) can be calculated as the following formula (16).

$$g(I, p) = \exp\left(-\frac{MAD(I, p)^2}{2\sigma^2}\right) \quad (16)$$

Here, σ represents a standard variation of a Gaussian function, i.e., an intensity of noise. Therefore, in a case where a lot of noise is included in an image or a case where images to be associated with each other are not similar, the value σ is to be set to a large value. The value σ can be preset based on a target image, or the like, based on an input image.

Figure 17:
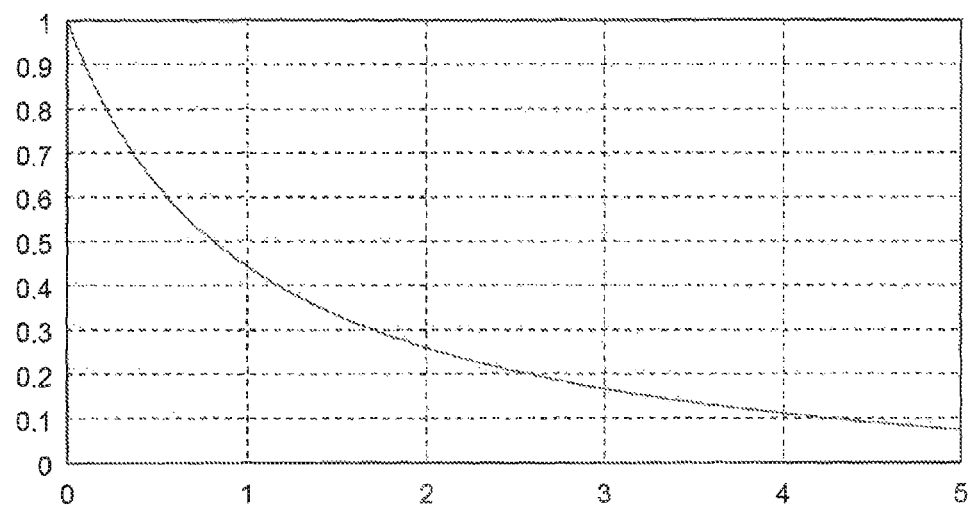
FIG. 17 is an illustration showing an example of another function that can be used instead of the gauss function shown in FIG. 16.

A function as shown in FIG. 17 can also be used. In such case, a weight using the MSB can be calculated as the following formula (17).

$$g(I, p) = -\frac{e}{MSE(I, p) + \varepsilon} \quad (17)$$

On the other hand, a weight using the MAD can be calculated as the following formula (18), $$g(I, p) = \frac{\varepsilon}{MAD(I, p) + \varepsilon} \quad (18)$$

Here, ϵ is a constant for excepting a division by 0. As for ϵ, it is possible to previously set an appropriate constant such as 0.1, 1.0, or the like. Regarding characteristics, the larger the ϵ is the smoother the weight function becomes, and the smaller the ϵ is the more precipitous the weight function becomes.

Step S109; Particle Vector Processing Step

In the particle vector processing step shown in step S109 of FIG. 2, by conducting a statistical processing on the particle vectors according to the corresponding on the weights corresponding to the particle vectors, a corresponding vector of the target block is calculated.

In the statistical processing, a mean weigh as shown in the following formula (19), for instance, can be used.

$$v(I) = \frac{1}{Q} \sum_{p \in P} g(I, p) p \quad (19)$$

$$Q = \sum_{p \in P} g(I, p)$$

Corresponding vectors calculated by using the formula (19) are corresponding vectors typified by the target block. Therefore, these corresponding vectors are assigned as corresponding vectors in the target block as the following formula (20).

$$V(X,h,t)=v(i)$$

$$\forall X \in \{X | B_x i \leq x < B_x i + B_x, B_y j \leq y < B_y j + B_y\} \quad (20)$$

Instead of the mean weight shown in the formula (19), a weighted median shown in the following formula (21) can be used. In the formula (21), "arg min.sub.x.E ("x" is under "arg min") indicates a value of x that makes a value of E minimum.

$$V(I) = \underset{q \in P}{\operatorname{argmin}} \sum_{p \in P} g(I, p)(p - q)^T (p - q) \quad (21)$$

By recursively executing the steps described above according to the flow shown in FIG. 2, it is possible to stably obtain the corresponding vector for such a region with less texture, too.

For example, in U.S. Pat. No. 3,147,693 (hereinafter to be referred to as Reference 1), vectors of blocks having been calculated spatially or at a passed frame are used as candidate vectors, a search is conducted limitedly to regions where update vectors are added to the candidate vectors, and a recursive processing is conducted on the whole image. Thereby, it is possible to conduce stable association with a less calculation amount. This is based on a fact that when an object has a size larger than a certain size, a solution vector of the target block is given by a vector close to a spatially-adjacent block or a temporally-past adjacent block. By recursively conducting these processes for the whole screen, it is possible to associate a large motion with a less calculation amount.

However, in Reference 1, because a solution is selected based on a small number of candidate vectors, there is a problem in that an association for a region with less texture may easily become.

On the other hand, in the first embodiment, as described above, the particle vectors are arranged around the candidate vectors, the weight (also referred to as probability density) for each particle vector is calculated, and the corresponding vector is calculated by conducting statistical processing based on each weight. Thereby, even when a solution is not stabilized to a single solution in a region with less texture, because it is possible to estimate a true corresponding vector based on the statistical distribution, it is possible to stably obtain the corresponding vector.

Second Embodiment

Next, an image processing device, a method, a computer-readable medium and a 3D image display according to a second embodiment will be explained below in detail with reference to the accompanying drawings. In the second embodiment, a case of solving a problem for obtaining association from a left-eye image to a right-eye image in a stereo image for a stereoscopic vision with a naked eye is exemplified. In the following, as for the same structures and operation as the above-described embodiment, redundant explanations will be omitted by referring to them. Furthermore, because the target image 100 and the reference image 200 in the first embodiment can be replaced with a left-eye image and a right-eye image, respectively, in the following description, they will be referred to as a left-eye image 100 and a right-eye image 200. It is also possible to have the left-eye image 100 and the right-eye image 200 interchanged. Moreover, in the following, a corresponding vector in the first, embodiment is expressed as a disparity vector.

Figure 18:
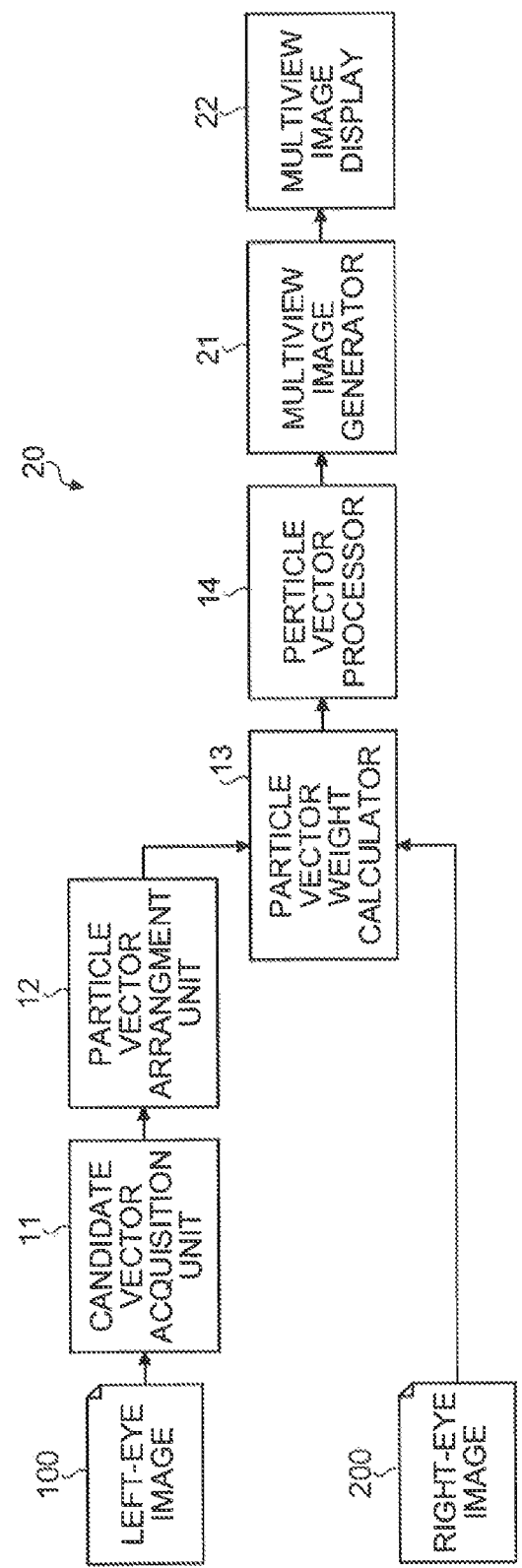
FIG. 18 is a block diagram showing an example of an outline structure of a 3D image display device according to a second embodiment.

FIG. 18 is a block diagram showing an example of an outline structure of a 3D image display device according to the second embodiment. The 3D image display device 20 shown in FIG. 18 is configured for generating multiview images used for a glasses-less 3D view, or the like, from a stereo video picture. As is evident from comparing FIG. 18 and FIG. 1, the 3D image display device 20 has the same structure as the image processing device 10 according to the first embodiment, but further has a multiview image generator 21 and a multiview image display 22. The multiview image generator 21 generates multiview images based on a corresponding vector V outputted from the particle vector processor 14. The multiview image display 22 displays the multiview images generated by the multiview image generator 21.

Figure 19:
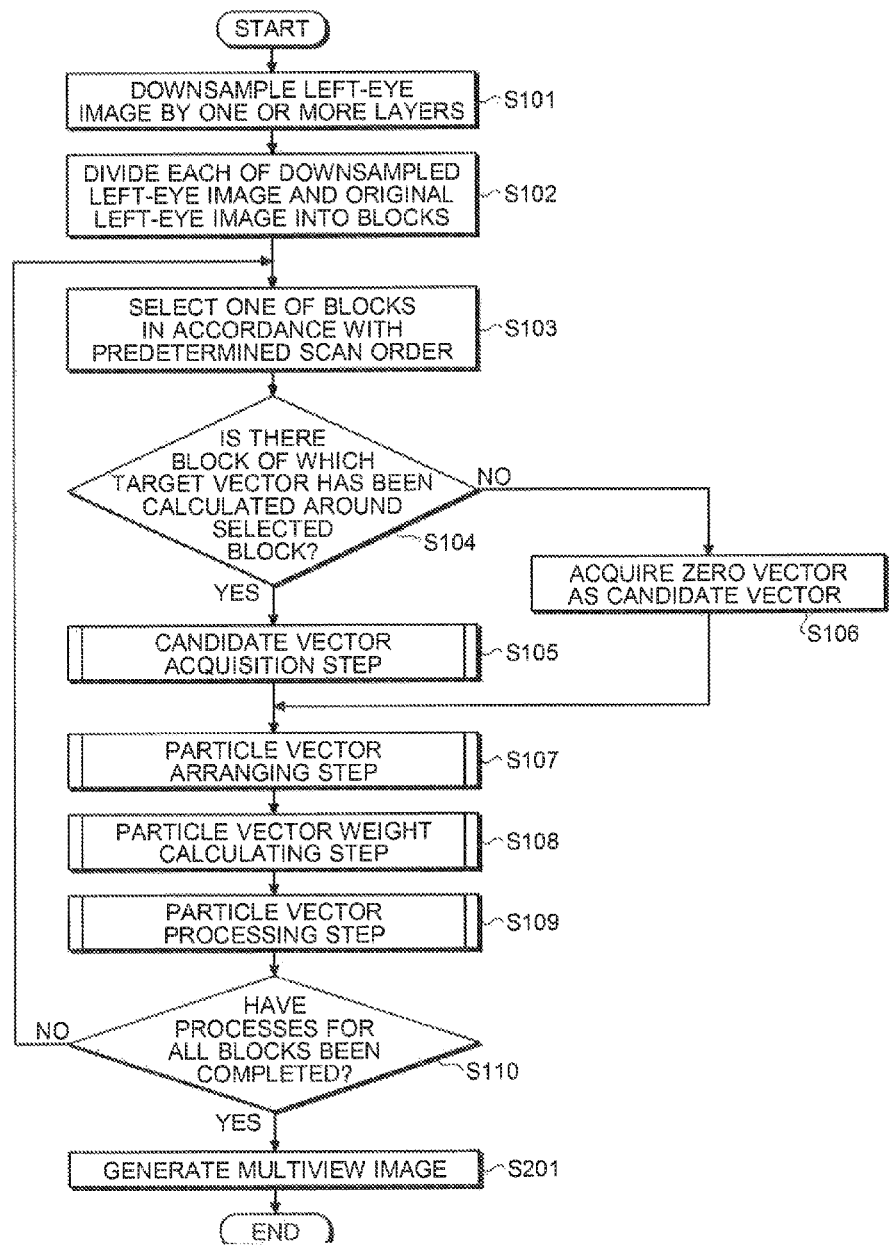
FIG. 19 is a flowchart showing an operation example of the multiview image generating device shown in FIG. 19.

In FIG. 19, an operation example of the 3D image display shown in FIG. 18 is shown. As is evident from comparing FIG. 19 and FIG. 2, the 3D image display device 20 calculates a disparity vector V for the target block by executing the same operation shown in FIG. 2 (steps S101 to S110). After that, the multiview image generator 21 generates a desired number of multiview images from the left-eye image 100 and the disparity vector V (step S201). Thereby, the multiview images used for a glasses-less 3D view, or the like, are generated.

Figure 20:
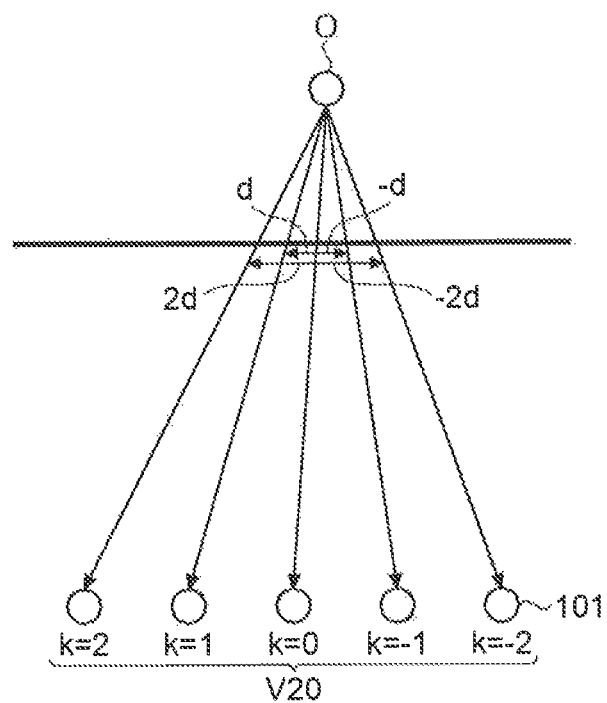
FIG. 20 is a conceptual diagram showing a generation of multiview images in the second embodiment.

Here, as shown in FIG. 20, when the left-eye image 100 is generated based on an intermediate view point between the left eye and the right eye, view numbers, while a center position between both eyes being considered as O, can be set as negative on the right side and as positive on the left side. In such case, the multiview images can be generated from a disparity vector V20 being k times a disparity vector d using the following formula (22).

$$d_k = kd \quad (22)$$

Furthermore, each multiview image can be generated by shifting a pixel value $I_o(x)$ of the left-eye image 100 according to the disparity vector $d_k$. However, there is a possibility of forming a void if the multiview image is just simply shifted. In such case, it is preferable that the void region is interpolated based on peripheral disparity vectors V. Because the other structures, operations and effects are the same as the first embodiment, the detailed descriptions are omitted here.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device which obtains a corresponding vector indicating an association from a target block on a first image to a corresponding block on a second image, which is different from the first image, the device comprising at least one processor programmed to:

acquire candidate vectors from among corresponding vectors which have been calculated for each of the candidate blocks around a target block;

set particles indicating positions on the second image around each of candidate corresponding blocks indicated by each of the acquired candidate vectors using the target block as a reference, and arrange particle vectors indicating each of the particles by using the target block as a reference;

calculate a weight based on differences between pixel values of the target block on the first image and pixel values of each block on the second image specified for each of the particles, and give the calculated weight to each of the particle vectors;

obtain a solution of the corresponding vector for the target block on the basis of a weighted average over all of the particle vectors; and transmitting the solution of the corresponding vector to an image generator, the image generator being configured to generate one or more images based on the solution of the corresponding vector.

2. The device according to claim 1, wherein the at least one processor is further programmed to:
calculate the weight given to each of the particle vectors based on a mean squared error (MSE) obtained with equation (1) from pixel values of the target block and pixel values of each block specified for each of the particles, $$MSE(I, p) = \frac{1}{B_x B_y} \sum_{X \in \{X | B_x i \le x < B_x i + B_x, B_y j \le y < B_y j + B_y\}} (A_r(X + p, h, t) - A_0(X, h, t))^2 \qquad (1)$$

where T is a transposition of a matrix vector,
is the target block,
p is the particle vector,
(Bx, By) are sizes of the block in horizontal(x) and vertical(y) directions,
h is a hierarchy of an image,
(X, h) are coordinates of each pixel with respect to a specific reference pixel on an image having a hierarchical structure,
A0(X, h) is a pixel value of each pixel on the target block,
Ar(X, h) is a pixel value of each pixel on the corresponding block, and
t is a time given to the image.

3. The device according to claim 2, wherein the at least one processor is further programmed to:
calculate the weight given to each of the particle vectors using a Gauss function represented by equation (2) having a standard deviation $\sigma$ $$g(I, p) = \exp\left(-\frac{MSE(I, p)}{2\sigma^2}\right). \qquad (2)$$

4. The device according to claim 2, wherein the at least one processor is further programmed to:
calculate the weight given to each of the particle vectors using a function represented by equation (3) having a constant $\epsilon$ $$g(I, p) = \frac{\varepsilon}{MSE(I, p) + \varepsilon}. \qquad (3)$$

5. The device according to claim 1, wherein the at least one processor is further programmed to:
calculate the weight given to each of the particle vectors based on a mean absolute difference (MAD) obtained with equation (4) from pixel values of the target block and pixel values of each block specified for each of the particles, $$MAD(I, p) = \frac{1}{B_x B_y} \sum_{X \in \{X | B_x i \le x < B_x i + B_x, B_y j \le y < B_y j + B_y\}} |A_r(X + p, h, t) - A_0(X, h, t)| \qquad (4)$$

where T is a transposition of a matrix vector,
is the target block,
p is the particle vector,
(Bx, By) are sizes of the block in horizontal(x) and vertical(y) directions,
h is a hierarchy of an image,
(X, h) are coordinates of each pixel with respect to a specific reference pixel on an image having a hierarchical structure,
A0(X, h) is a pixel value of each pixel on the target block,
Ar(X, h) is a pixel value of each pixel on the corresponding block, and
t is a time given to the image.

6. The device according to claim 5, wherein the at least one processor is further programmed to:
calculate the weight given to each of the particle vectors using a Gauss function represented by a following equation (5) having a standard deviation $\sigma$ $$g(I, p) = \exp\left(-\frac{MAD(I, p)^2}{2\sigma^2}\right). \qquad (5)$$

7. The device according to claim 5, wherein the at least one processor is further programmed to:
calculate the weight given to each of the particle vectors using a function represented by a following equation (6) having a constant $\epsilon$ $$g(I, p) = \frac{\varepsilon}{MAD(I, p) + \varepsilon}. \qquad (6)$$

8. The device according to claim 1, wherein
at least one of the particle vectors indicates the particle located on a different position from the candidate corresponding block indicated by the candidate vector.

9. The device according to claim 1, wherein the at least one processor is further programmed to:
generate one or more multiview images from the first image using the corresponding vector for the target block.

10. The device according to claim 1, wherein the candidate corresponding blocks includes at least one of a spatial near-field region, a temporal near-field region and a hierarchic near-field region of the target block.

11. A method for obtaining a corresponding vector indicating an association from a target block on a first image to a corresponding block on a second image, which is different from the first image, the method including:
acquiring candidate vectors from among corresponding vectors which have been calculated for each of the candidate blocks around a target block;
setting particles indicating positions on the second image around each of candidate corresponding blocks indicated by each of the acquired candidate vectors using the target block as a reference, and arranging particle vectors indicating each of the particles by using the target block as a reference;
calculating a weight based on differences between pixel values of the target block on the first image and pixel values of each block on the second image specified for each of the particles, and give the calculated weight to each of the particle vectors;

obtaining a solution of the corresponding vector for the target block on the basis of a weighted average over all of the particle vectors, and transmitting the solution of the corresponding vector to an image generator, the image generator being configured to generate one or more images based on the solution of the corresponding vector.

12. A computer program product comprising a non-transitory computer readable medium that stores therein a program for operating a computer to obtain a corresponding vector indicating an association from a target block on a first image to a corresponding block on a second image, which is different from the first image, the program comprising the instructions of:

acquiring candidate vectors from among corresponding vectors which have been calculated for each of the candidate blocks around a target block;

setting particles indicating positions on the second image around each of candidate corresponding blocks indicated by each of the acquired candidate vectors using the target block as a reference, and arranging particle vectors indicating each of the particles by using the target block as a reference;

calculating a weight based on differences between pixel values of the target block on the first image and pixel values of each block on the second image specified for each of the particles, and give the calculated weight to each of the particle vectors;

obtaining a solution of the corresponding vector for the target block on the basis of a weighted average over all of the particle vectors, and transmitting the solution of the corresponding vector to an image generator, the image generator being configured to generate one or more images based on the solution of the corresponding vector.

13. A 3D display apparatus which obtains a multiview vector indicating an association from a target block on a first image to a corresponding block on a second image, which is different from the first image, the apparatus comprising at least one processor programmed to:

acquire candidate vectors from among corresponding vectors which have been calculated for each of the candidate blocks around a target block;

set particles indicating positions on the second image around each of candidate corresponding blocks indicated by each of the acquired candidate vectors using the target block as a reference, and arrange particle vectors indicating each of the particles by using the target block as a reference;

calculate a weight based on differences between pixel values of the target block on the first image and pixel values of each block on the second image specified for each of the particles, and give the calculated weight to each of the particle vectors;

obtain a solution of the corresponding vector for the target on the basis of a weighted average over all of the particle vectors; and transmit the solution of the corresponding vector to an image generator, the image generator being configured to generate one or more images based on the solution of the corresponding vector, wherein:

the image generator is further configured to generate one or more multiview images from the first image using the multiview vector; and a display is configured to display the one or more multiview images generated by the image generator.

14. The device according to claim 1, wherein the at least one processor programmed to calculate the weight based on an average of values, the values are based on differences between pixel values in the target block on the first image and pixel values in each block on the second image specified for each of the particles, and give the calculated weight to each of the particle vectors.

* * * * *